(12) United States Patent
Condeelis

(10) Patent No.: US 7,401,824 B2
(45) Date of Patent: Jul. 22, 2008

(54) REINFORCED ENERGY ABSORBING BUMPER

(75) Inventor: Paul M. Condeelis, Marine City, MI (US)

(73) Assignee: Romeo-Rim, Inc., Romeo, MI (US)

( * ) Notice: Subject to any disclaimer, the term of this patent is extended or adjusted under 35 U.S.C. 154(b) by 132 days.

(21) Appl. No.: 11/116,602

(22) Filed: Apr. 29, 2005

(65) Prior Publication Data

US 2006/0255604 A1 Nov. 16, 2006

(51) Int. Cl.
B60R 19/03 (2006.01)
(52) U.S. Cl. .................. 293/121; 293/120
(58) Field of Classification Search .......... 293/121, 293/120, 122, 102, 142–144, 155; 296/187.03, 296/187.1; 411/531
See application file for complete search history.

(56) References Cited

U.S. PATENT DOCUMENTS

| 3,991,146 | A | * | 11/1976 | Barrie | 264/46.7 |
| 4,088,357 | A | * | 5/1978 | Klie et al. | 293/122 |
| 4,372,701 | A | * | 2/1983 | Watanabe | 403/24 |
| 4,492,398 | A | * | 1/1985 | Peter | 293/120 |
| 5,215,343 | A | * | 6/1993 | Fortune | 293/121 |
| 5,271,650 | A | * | 12/1993 | Fukuhara et al. | 293/120 |
| 5,560,662 | A | * | 10/1996 | Apgar, Jr. et al. | 293/121 |
| 5,975,000 | A | * | 11/1999 | Nakamura | 114/219 |
| 6,679,967 | B1 | * | 1/2004 | Carroll, III et al. | 156/222 |
| 2006/0054071 | A1 | * | 3/2006 | Barmakian et al. | 114/219 |
| 2006/0071486 | A1 | * | 4/2006 | Lamparter | 293/120 |

* cited by examiner

Primary Examiner—Dennis H. Pedder
Assistant Examiner—Melissa A Black
(74) Attorney, Agent, or Firm—Renner, Kenner, Greive, Bobak, Taylor & Weber

(57) ABSTRACT

An energy absorbing bumper (10) includes a back plate (11) which is adapted to be attached to a vehicle. An elastomeric module (12) includes an impact face (13) and upper and lower rails (14, 15) extending from the impact face (13). One or more metallic inserts (30) are molded into the rails (14, 15). Each insert (30) includes a plurality of longitudinally extending, laterally spaced bars (31) which intersect a plurality of laterally extending, longitudinally spaced bars (32) to form adjacent rows of openings (33, 34). A fastener (17) extends through at least one of the openings (33, 34) in each insert (30) to attach the rails (14, 15) to the back plate (11). The inserts (30) minimize the possibility of shearing of the module (12) at the area of fasteners (17).

7 Claims, 2 Drawing Sheets

US 7,401,824 B2

REINFORCED ENERGY ABSORBING BUMPER

TECHNICAL FIELD

This invention relates to an energy absorbing bumper for a vehicle. More specifically, this invention relates to such a bumper which is molded of a elastomeric material with a metallic insert therein to resist torsional forces and prevent shearing of the elastomeric material.

BACKGROUND ART

Energy absorbing bumpers for vehicles, such as cars, buses or the like, are well known in the art. Most typically, such bumpers are made of an elastomeric material, such as polyurethane or the like, and are at times filled with a foam or similar material. Usually these bumpers are provided in a modular form and are attached, as by screws or other fasteners, to a metallic back plate which is carried by the vehicle. Such bumpers are thus intended to absorb energy of the contact of the vehicle with another structure, and typically they assure that no damage is done to the vehicle in a crash of up to five miles an hour. These bumpers are most prevalently found on buses.

While these bumpers thus satisfactorily cushion the force of direct impacts, the prior art bumpers are inadequate when torsional forces are involved. Such forces might be encountered, for example, if one vehicle is pushing another vehicle, particularly around a street corner, or if other than a direct impact were encountered. In these instances, a lateral end of the bumper may be exposed to a torsional force which can tear the module away from the back plate at the area of the fasteners.

Thus, the need exists for an energy absorbing bumper which can resist both direct and torsional forces.

DISCLOSURE OF THE INVENTION

It is thus an object of the present invention to provide an energy absorbing bumper which can withstand both direct forces and torsional forces.

It is another object of the present invention to provide an energy absorbing bumper, as above, which resists tearing at the area of the connection to the back plate when exposed to a torsional force.

These and other objects of the present invention, as well as the advantages thereof over existing prior art forms, which will become apparent from the description to follow, are accomplished by the improvements hereinafter described and claimed.

In general, an energy absorbing bumper for a vehicle includes a plate adapted to be attached to the vehicle. An elastomeric module is carried by the plate and includes an impact face and opposed rails extending therefrom. At least one metallic insert having at least one opening is positioned in each rail. At least one fastener extends through an opening in the insert in each rail to attach each rail to the plate.

In accordance with another aspect of the invention, an insert is provided for a module of a bumper and is adapted to receive a fastener that attaches the module to a plate of the bumper. The insert includes a plurality of metallic bars forming at least one opening therebetween. The fastener is adapted to be received within the opening.

A preferred exemplary energy absorbing bumper made in accordance to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 3:
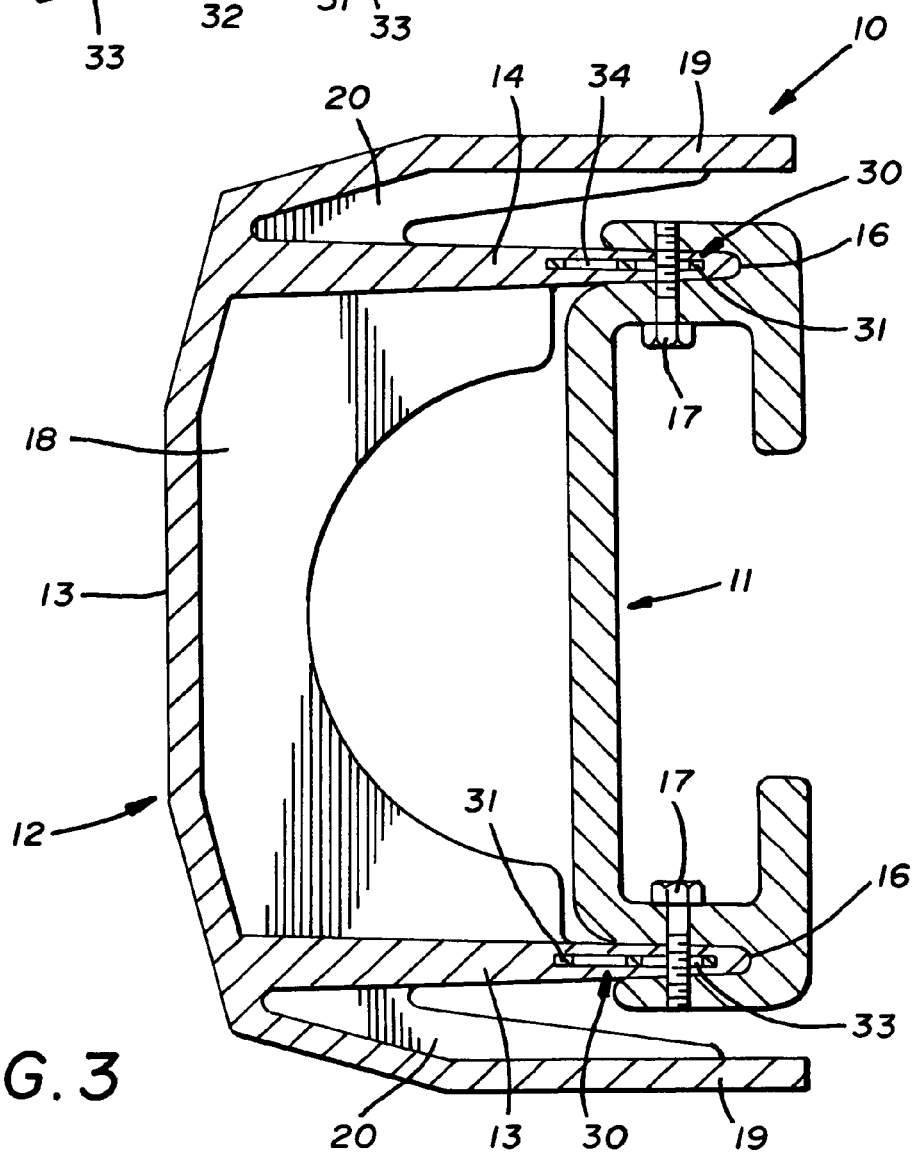
FIG. 3 is a sectional view taken substantially along line 3-3 of FIG. 2.
Figure 2:
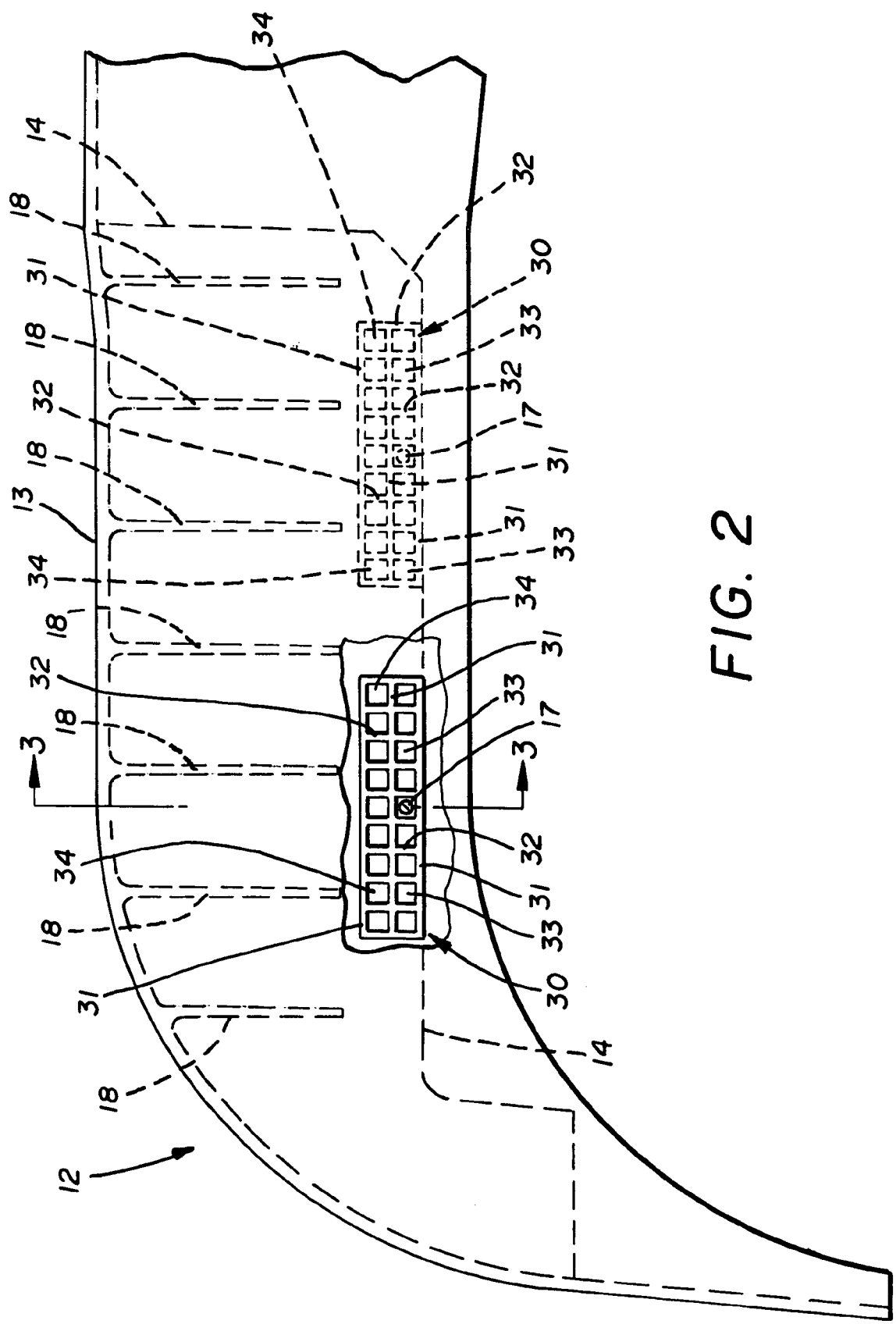
FIG. 2 is a fragmentary, top plan view of an energy absorbing bumper showing two of the inserts of FIG. 1 positioned therein.

A bumper made in accordance with the present invention is shown in FIGS. 2 and 3 and is indicated generally by the numeral 10. Bumper 10 includes a metallic back plate 11 which can be mounted in a conventional manner to the front or rear of a vehicle. Back plate 11 carries an energy absorbing bumper module generally indicated by the numeral 12. While the exact nature of the material of module 12 is not critical to the present invention, a typical module 12 is made of an elastomeric material such as polyurethane. Module 12 could be made as one integral unit, that is, the size of an entire bumper for a vehicle. However, typically a bumper 10 is constructed with a module 12 formed in at least three segments, two corner module segments (one of which is shown in FIG. 2) and a central module segment having ends which telescope within the ends of opposed corner module segments.

Module 12 includes a front impact face 13 which extends longitudinally along the bumper 10 along one corner module, through the central module, and along the other corner module. Impact face 13 thus extends laterally across the vehicle to which bumper 10 is mounted. All segments of module 12 include upper and lower rails 14 and 15, respectively. To attach module 12 to back plate 11, the rear end of rails 14 and 15 are received in slots 16 formed in back plate 11 and attached thereto by fasteners 17 which can be in the form of self-taping screws, bolts or the like. A plurality of fasteners 17 may be longitudinally spaced along bumper 10, two such fasteners 17 being shown in FIG. 2. Module 12 can also include a plurality of generally C-shaped vertical ribs 18 which enhance the energy absorption of vehicle bumper 10, and which are spaced longitudinally within module 12. Vertical ribs 18 extend rearwardly from impact face 13 and along upper and lower rails 14 and 15. Module 12 is also shown as having upper and lower wings 19 with reinforcing ribs 20 extending therefrom to upper and lower rails 14 and 15. These wings 19 are primarily for aesthetic purposes and generally play no role in the energy absorbing characteristics of the system.

Figure 1:
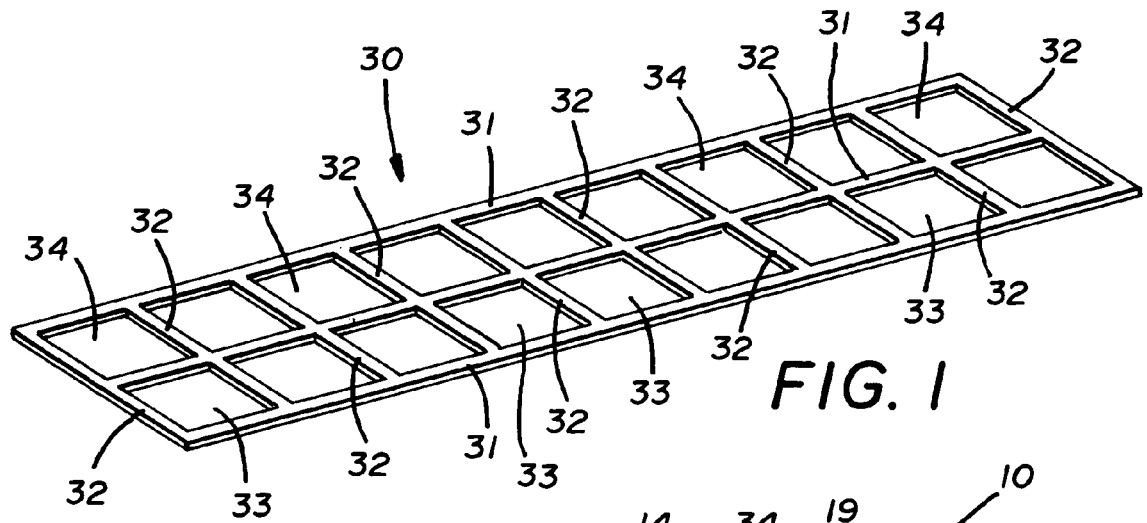
FIG. 1 is perspective view of an insert which can be positioned within an energy absorbing bumper.

A bumper insert made in accordance with the present invention is shown in FIG. 1 and is indicated generally by the numeral 30. Insert 30 is preferably made of stainless steel and is formed by a plurality of longitudinally extending, laterally spaced bars 31 which are intersected by a plurality of laterally extending, longitudinally spaced bars 32. As a result, a plurality of longitudinally adjacent openings 33 are formed which are positioned laterally adjacent to a second set of longitudinally adjacent openings 34.

One or more bumper inserts 30 may be positioned in each upper rail 14 and each lower rail 15. To that end, the inserts 30 to be included in bumper 10 are positioned, where desired, in the mold from which bumper 10 is to be manufactured, and the polyurethane material is molded around any insert 30 so positioned. The openings 33 and 34 are preferably the approximate size of a fastener 17, and thus, as shown in FIG. 2, the fasteners 17 can extend through an opening 33. While any number of inserts 30 could be provided longitudinally along rails 14 and 15, their need is greatest in the corner modules, and thus, it is preferred to provide inserts 30 only in the corner modules of bumper 10, one of which is shown in FIG. 2.

When bumper 10 experiences other than a direct force, such as a torsional force on a corner module, inserts 30 will tend to prevent the shearing or tearing problems at the location of fasteners 17 experienced by the prior art. In fact, it has been found that modules 12 equipped with an insert 30 can generally withstand more than five times the force before shearing. This is because each fastener is encapsulated within opposed pairs of bars 31 and opposed pairs of bars 32. While the openings 33 and 34 are shown as being square, other configurations, such as round, are contemplated by this invention as long as the fasteners are fully surrounded. When square, the size of a side of an opening 33, 34 should approximate the diameter of the fastener 17. Moreover, while an insert 30 could be provided with only one opening, by providing insert 30 with multiple openings, the manufacturing process is simplified. That is, the precise positioning of insert 30 in rails 14 and 15 is not critical because if a fastener 17 does not find its way through one opening 33, 34, it will find its way through the next adjacent opening 33, 34.

It should thus be evident that a bumper 10 constructed as described herein, with one or more inserts 30 imbedded therein, accomplishes the objects of the present invention and otherwise substantially improves the art.

What is claimed is:

1. An energy absorbing bumper for a vehicle comprising a plate adapted to be attached to the vehicle; an elastomeric module carried by said plate, said module including an impact face and opposed rails extending from said impact face; at least one metallic insert completely embedded in each rail, each said insert having a plurality of adjacent openings therein extending completely through said insert; and at least one fastener to attach each rail to said plate, said fastener extending through one of said adjacent openings without engaging said insert.

2. The bumper of claim 1 wherein each said insert includes a plurality of longitudinally extending, laterally spaced first bars and a plurality of laterally extending, longitudinally spaced second bars, said first and second bars intersecting to form said openings.

3. The bumper of claim 2 wherein said first and second bars form a first set of longitudinally spaced openings positioned laterally adjacent to a second set of longitudinally spaced openings.

4. The bumper of claim 1 wherein each said opening is approximately the size of said fastener so that said insert encapsulates said fastener.

5. The bumper of claim 1 wherein said insert is made of stainless steel.

6. The bumper of claim 1 wherein each said opening in said insert is generally square.

7. The bumper of claim 6 wherein said fastener is a screw having a diameter approximately the size of a side of each said opening.

* * * * *